United States Patent
Chen et al.

(10) Patent No.: US 6,874,791 B2
(45) Date of Patent: Apr. 5, 2005

(54) CHUCK APPARATUS

(75) Inventors: Tsai-Ching Chen, No. 202, Lane 330, Sec. 7, Chang Lu Road, Fu Hsing Hsiang, Chang Hua Hsien (TW); Chiu-Man Chang-Kao, Taichung Hsien (TW)

(73) Assignee: Tsai-Ching Chen, Chang Hua Hsien (TW)

( * ) Notice: Subject to any disclaimer, the term of this patent is extended or adjusted under 35 U.S.C. 154(b) by 83 days.

(21) Appl. No.: 10/444,839

(22) Filed: May 23, 2003

(65) Prior Publication Data

US 2004/0232631 A1 Nov. 25, 2004

(51) Int. Cl.[7] .......................................... B23B 31/107

(52) U.S. Cl. ......................... 279/75; 279/14; 279/155; 7/158; 7/165; 408/240

(58) Field of Search ................... 7/158, 165; 279/14, 279/22, 30, 74, 75, 143, 145, 155, 905; 408/239 R, 408/240

(56) References Cited

U.S. PATENT DOCUMENTS

| | | | | |
|---|---|---|---|---|
| 4,092,753 A | * | 6/1978 | Fuhrmann | 7/158 |
| 5,604,948 A | * | 2/1997 | McMahon et al. | 7/165 |
| 5,901,622 A | * | 5/1999 | Sweeny | 81/439 |
| 6,000,888 A | * | 12/1999 | Hartman | 408/239 R |
| 6,270,085 B1 | * | 8/2001 | Chen et al. | 279/22 |
| 6,325,393 B1 | * | 12/2001 | Chen et al. | 279/22 |
| 6,572,311 B2 | * | 6/2003 | Vasudeva | 408/226 |

* cited by examiner

*Primary Examiner*—Daniel W. Howell
*Assistant Examiner*—Michael W. Talbot
(74) *Attorney, Agent, or Firm*—Alan D. Kamrath; Nikolai & Mersereau, P.A.

(57) ABSTRACT

A chuck apparatus is provided for holding a tool bit. The tool bit includes a drill, two blades, another working head and an annular groove defined therein. The chuck apparatus includes a socket, a ball detent, a collar and a joint. The socket defines an axial hole, a peripheral hole communicated with the axial hole and two slots for receiving the blades. The ball detent is put in the peripheral hole for insertion in the annular groove. The collar is movably mounted on the socket between a locking position for pushing the ball detent into the annular groove and a releasing position for allowing the ball detent to leave the annular groove. The joint includes a first section secured to the socket and a second section for connection with a motor.

5 Claims, 12 Drawing Sheets

A-A

B-B

CHUCK APPARATUS

FIELD OF INVENTION

The present invention relates to a chuck apparatus for holding a tool bit with a first section and a second section for drilling a countersink hole.

BACKGROUND OF INVENTION

Referring to FIGS. 12 and 13, a conventional chuck apparatus including a socket 80 and a collar 90 movably mounted on the socket 80. The socket 80 includes a closed end for connection with a motor (not shown) and an open end for receiving a tool bit 94. A ball detent 92 is put in a hole (not numbered) transversely extending the socket 80. An internal edge of a ring 99 is put in an annular groove defined in an external face of the socket 80. The collar 90 defines, in an internal face, an annular groove 91 and an annular groove 96 separated from the annular groove 91 by means of an annular rib 97. A spring 93 is put in the annular groove 96, and compressed between the annular rib 97 and the ring 82. A ring 98 is fit in the collar 90 for abutment against the ring 82, thus avoiding the collar 90 escaping from the socket 80. Referring to FIG. 12, the collar 90 is pushed downward with one hand so as to allow the ball detent 92 to enter the annular groove 91, i.e., allow the ball detent 92 to leave the annular groove 95. Thus, the tool bit 94 can be inserted in the socket 80 with the other hand. Referring to FIG. 13, the collar 90 is released. The annular rib 97 is pushed upward by means of the spring 93 supported on the ring 82. The annular rib 97 pushes the ball detent 92 into an annular groove 95 defined in the tool bit 94, thus locking the tool bit 94 to the chuck apparatus. Referring to FIG. 12, the collar 90 is pushed downward with one hand in order to allow the ball detent 92 to enter the annular groove 91, i.e., allow the ball detent 92 to leave the annular groove 95. Thus, the tool bit 94 can be removed from the chuck apparatus with the other hand. This operation is however troublesome. There is a tool bit with a first section for driving a screw and a second section for drilling a countersink hole. The first section of the tool bit includes a screwdriver. The second section of the tool bit includes a drill and two blades. This conventional chuck apparatus however cannot receive the second section of the tool bit.

The present invention is therefore intended to obviate or at least alleviate the problems encountered in prior art.

SUMMARY OF INVENTION

It is an objective of the present invention to provide a chuck apparatus for holding a tool bit including a first section, a second section consisting of a drill and two blades and an annular groove defined therein.

It is another objective of the present invention to provide a chuck apparatus for automatically ejecting the tool bit.

According to the present invention, the chuck apparatus includes a socket, a ball detent, a collar and a joint. The socket defines an axial hole, a peripheral hole communicated with the axial hole and two slots for receiving the blades. The ball detent is put in the peripheral hole for insertion in the annular groove. The collar is movably mounted on the socket between a locking position for pushing the ball detent into the annular groove and a releasing position for allowing the ball detent to leave the annular groove. The joint includes a first section secured to the socket and a second section for connection with a motor.

The chuck apparatus may further include a pusher and a spring. The pusher is put movably in the axial hole of the socket for pushing the tool bit. The pusher defines an axial hole for receiving a portion of the tool bit and two slots for receiving the blades. The spring is put between the pusher and the joint.

Other objects, advantages and novel features of the invention will become more apparent from the following detailed description in conjunction with the attached drawings.

BRIEF DESCRIPTION OF DRAWINGS

The present invention will be described via detailed illustration of embodiments referring to the drawings.

DETAILED DESCRIPTION OF PREFERRED EMBODIMENT

Figure 1:
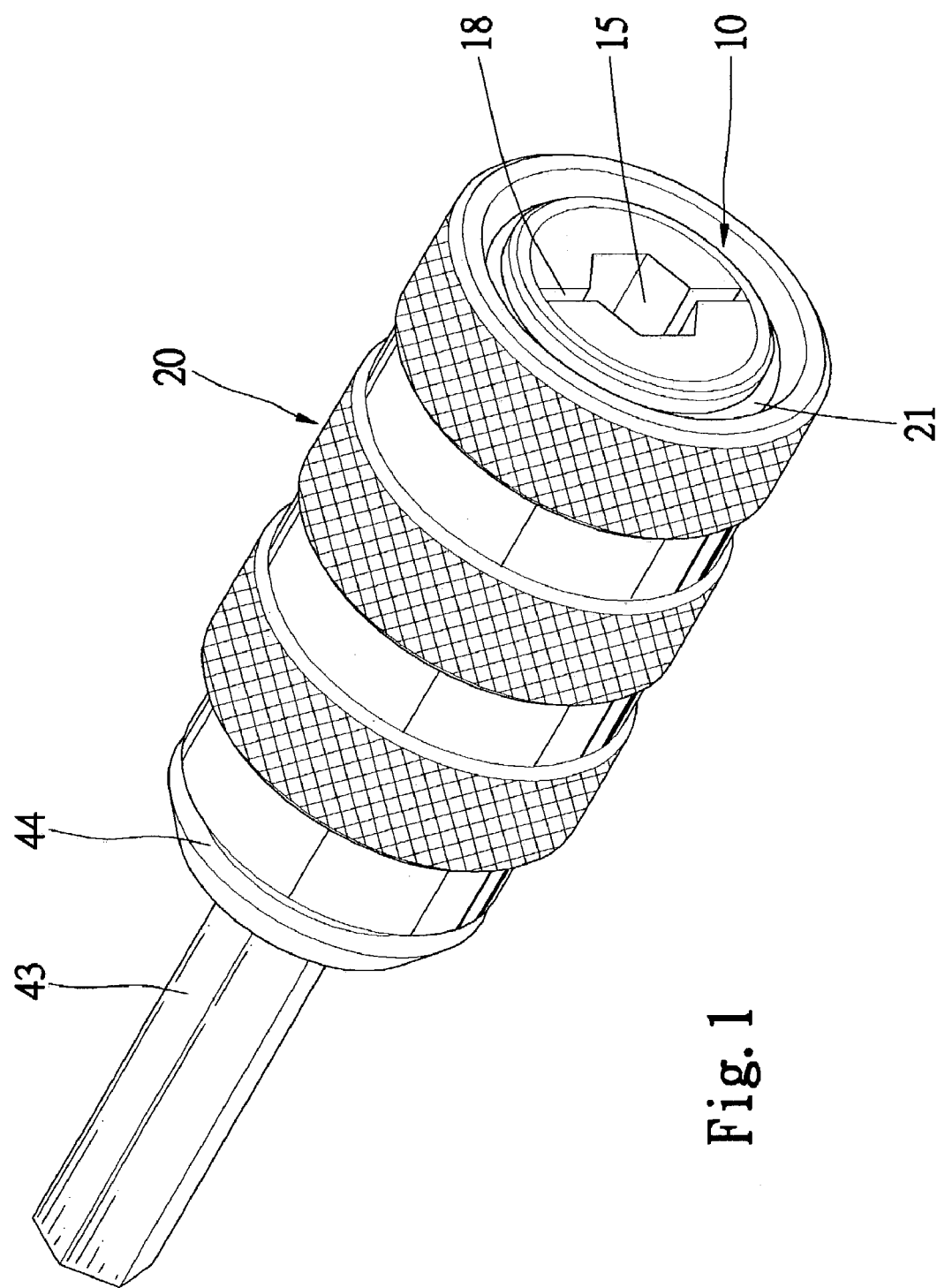
FIG. 1 is a perspective view of a chuck apparatus according to a first embodiment of the present invention.

Referring to FIGS. 6~11, a conventional tool bit 50 is shown. The tool bit 50 includes a first section for driving a screw and a second section for drilling a countersink hole. The second section of the tool bit 50 includes a drill 54 and two blades 52. The second section of the tool bit 50 includes a screwdriver 56. An annular groove 51 is defined in the tool bit 50 between the first and second sections.

Figure 2:
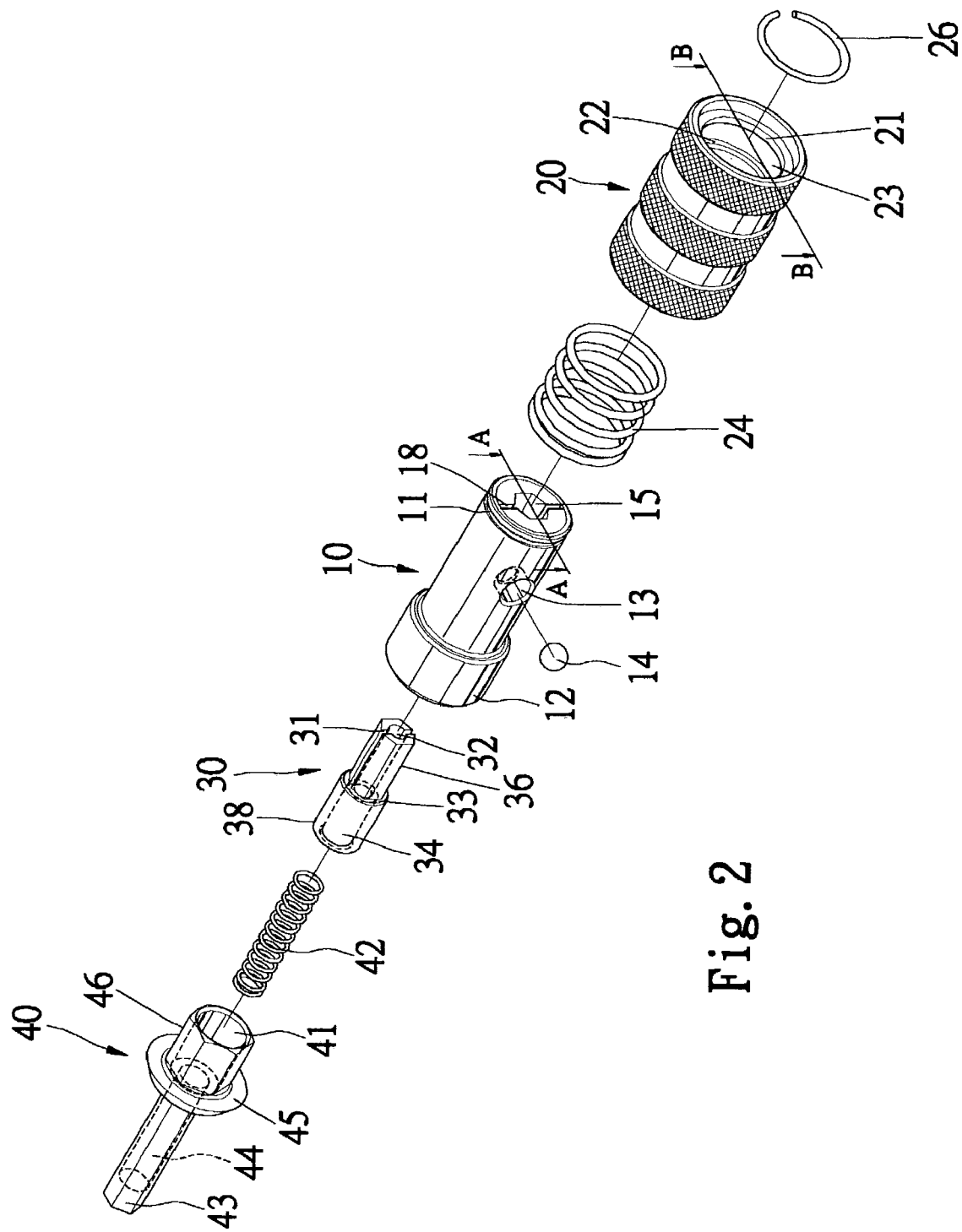
FIG. 2 is an exploded view of the chuck apparatus of FIG. 1.

Referring to FIGS. 1 and 2, according to the preferred embodiment of the present invention, a chuck apparatus includes a socket 10, a collar 20, a spring 24, a pusher 30, a joint 40 and a spring 42.

Figure 3:
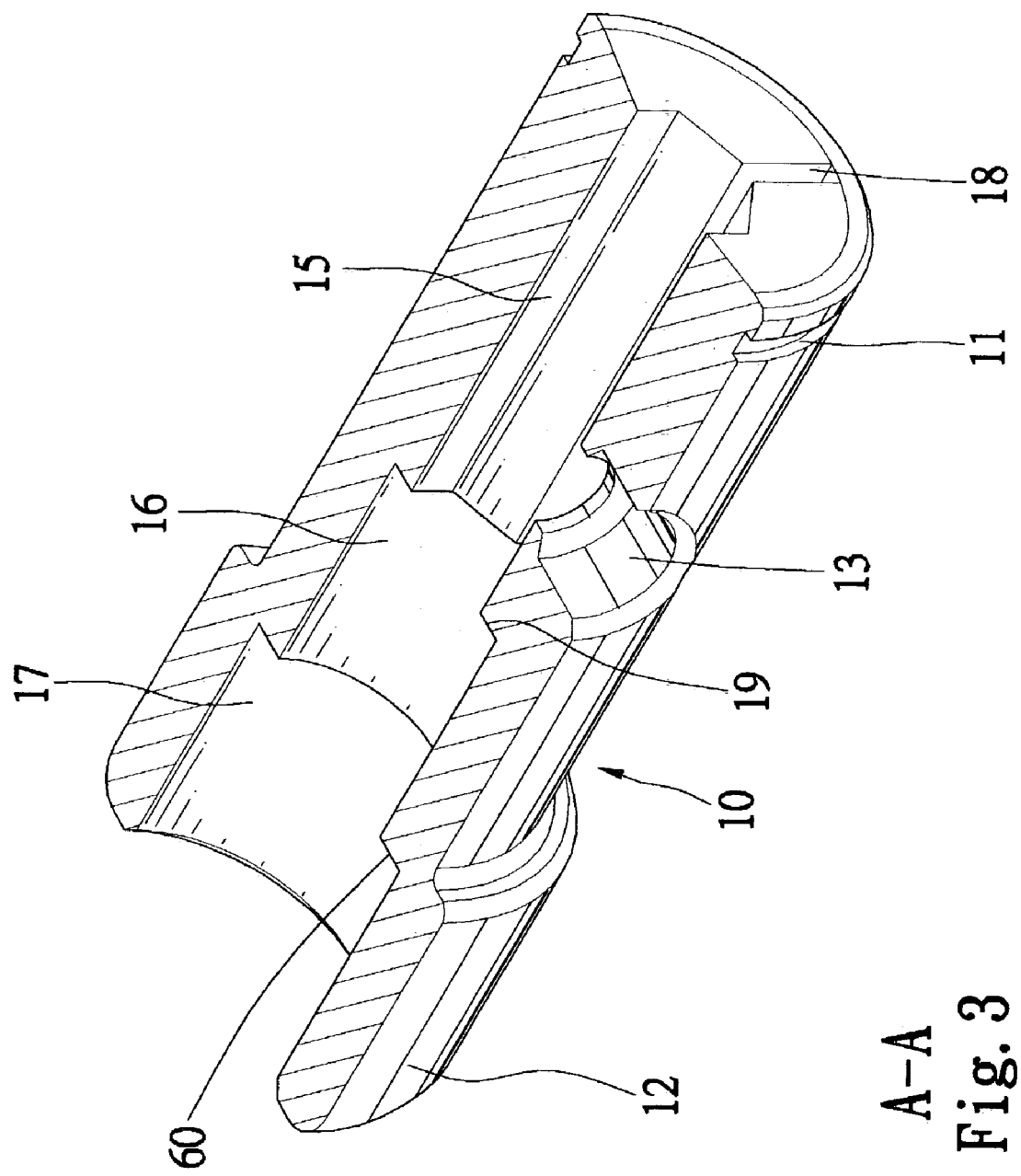
FIG. 3 is a cutaway view of a socket of the chuck apparatus of FIG. 1.

Referring to FIG. 3, the socket 10 defines a first chamber 15, a second chamber 16 communicated with the first chamber 15 and a third chamber 17 communicated with the second chamber 16. An annular shoulder 19 is formed between the chambers 15 and 16. An annular shoulder 60 is formed between the chambers 16 and 17. A hole 13 is defined in the socket 10 and communicated with the first chamber 15 in order to receive a ball detent 14. An annular rib 12 is formed on an internal face of the socket 10 at an end. An annular groove 11 is defined in the external face of the socket 10 near an opposite end.

Figure 4:
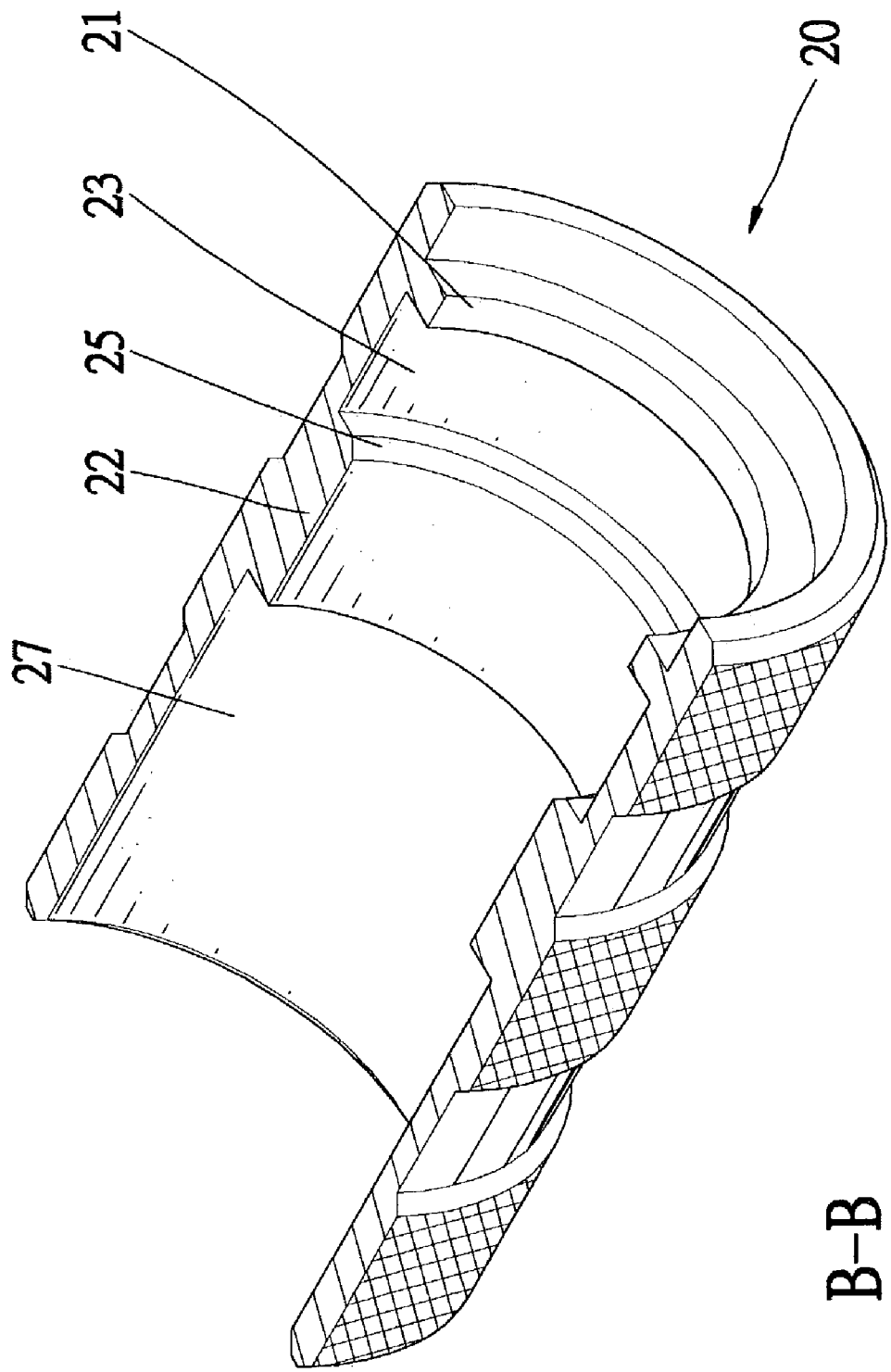
FIG. 4 is a cutaway view of a collar of the chuck apparatus of FIG. 1.

Referring to FIG. 4, the collar 20 defines, in an internal face, a first chamber 23 and a second chamber 27. An annular rib 22 is formed on the internal face of the collar 20 between the chambers 23 and 27. An annular rib 21 is formed on the internal face of the collar 20 beside the first chamber 23.

Referring to FIGS. 1 and 2, the pusher 30 includes a first section 36, an enlarged second section 38 and an annular shoulder 33 formed between the sections 36 and 38. The first section 36 defines a chamber 32 communicated with the chamber 34. Two slots 31 are defined in the first section 36.

The joint 40 includes a first section 46 for insertion in the socket 10, a second section 43 for connection with a motor (not shown) and an annular rib 45 formed between the sections 46 and 43 for abutment against the socket 10. The first section 46 defines a chamber 41 communicated with the chamber 44. The second section 43 defines a chamber 44.

Figure 5:
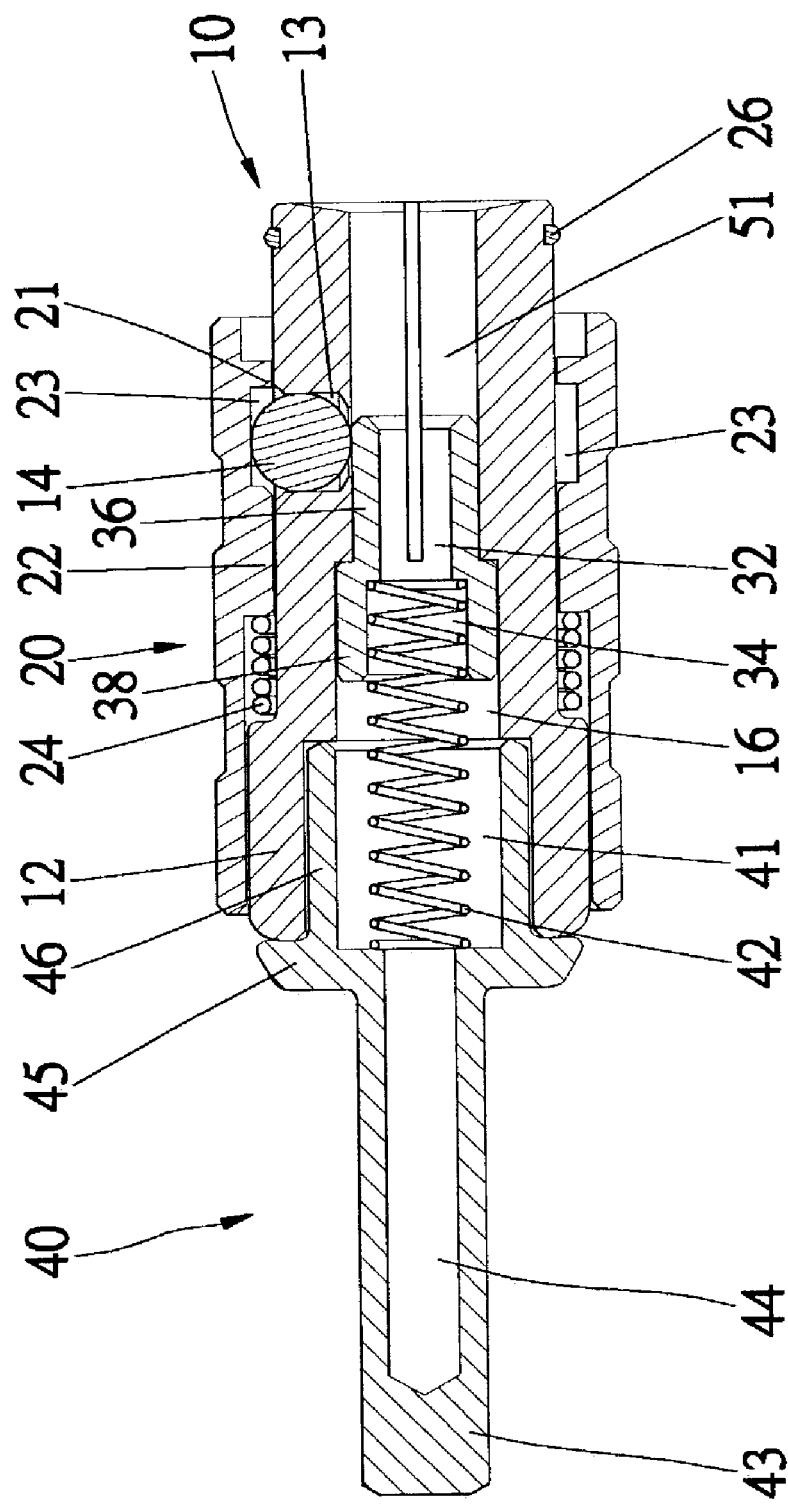
FIG. 5 is a cross-sectional view of the chuck apparatus of FIG. 1.

Referring to FIG. 5, the spring 24 is mounted on the socket 10. The collar 20 is mounted on the socket 20. The spring 24 is compressed between the annular rib 12 of the socket 10 and the annular rib 22 of the collar 20. A ring 26 is put in the annular groove 11, thus retaining the collar 20 on the socket 10. The pusher 30 is put in the socket 10. The first section 36 of the pusher 30 is inserted into the first chamber 15 of the socket 20. The second section 38 of the pusher 30 is restricted in the second chamber 16 of the socket 20 because of the annular shoulder 33 abutted against the annular shoulder 19 and the first section 46 of the joint 40 fit in the third chamber 17 of the socket 10. The spring 42 is compressed between the joint 40 and the pusher 30. The spring 42 includes a first end inserted in the chamber 34 of the second section 38 of the pusher 30 and a second end inserted in the chamber 44 of the first section 46 of the joint 40.

Figure 6:
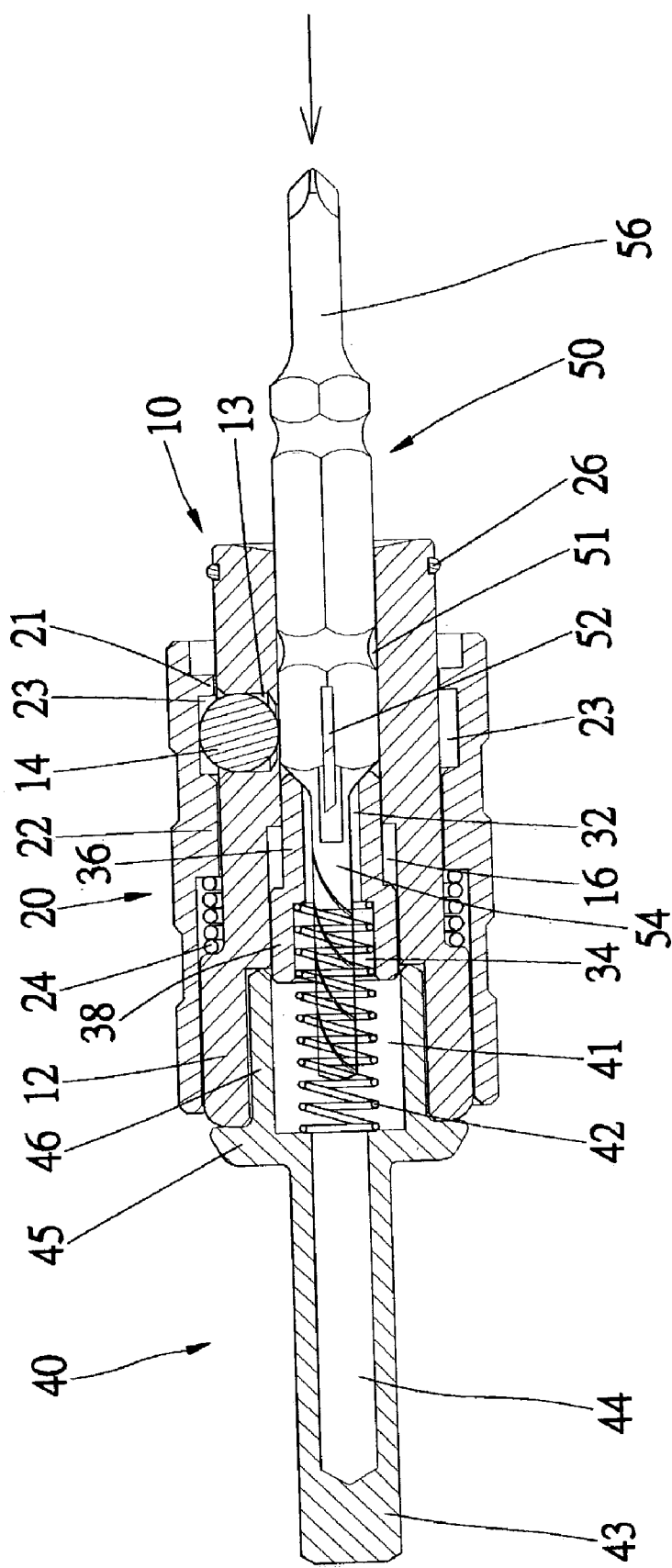
FIG. 6 is similar to FIG. 5 but showing the chuck apparatus ready for receiving and releasing a tool bit.

Referring to FIG. 6, a user can push, with one hand, the collar 20 so as to allow the ball detent 14 to enter the first chamber 23 of the collar 20, i.e., allow the ball detent 14 to leave the first chamber 15 of the socket 10. Thus, the drill 54 can be inserted in the chambers 15, 16 and 17 of the socket 10 with the other hand. The blades 52 are inserted in the slots 18 of the socket 10 and the slots of the pusher 30.

Figure 7:
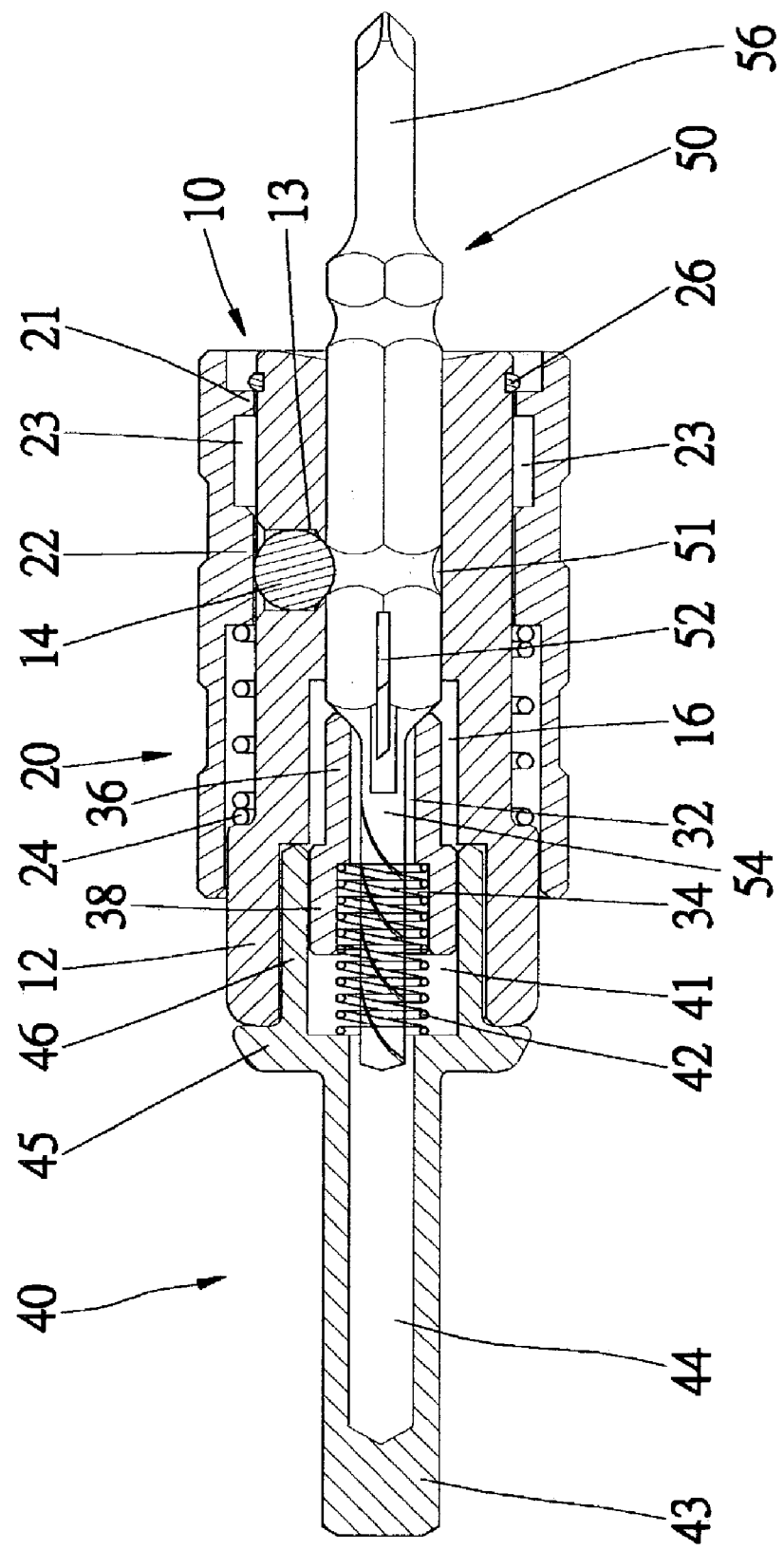
FIG. 7 is similar to FIG. 6 but showing the chuck apparatus locking the tool bit.

Referring to FIG. 7, the collar 20 is released. The annular rib 22 is pushed by means of the spring 24 abutted against the annular rib 12. The annular rib 22 pushes the ball detent 14 into the annular groove 51, thus locking the tool bit 50 to the chuck apparatus.

Figure 8:
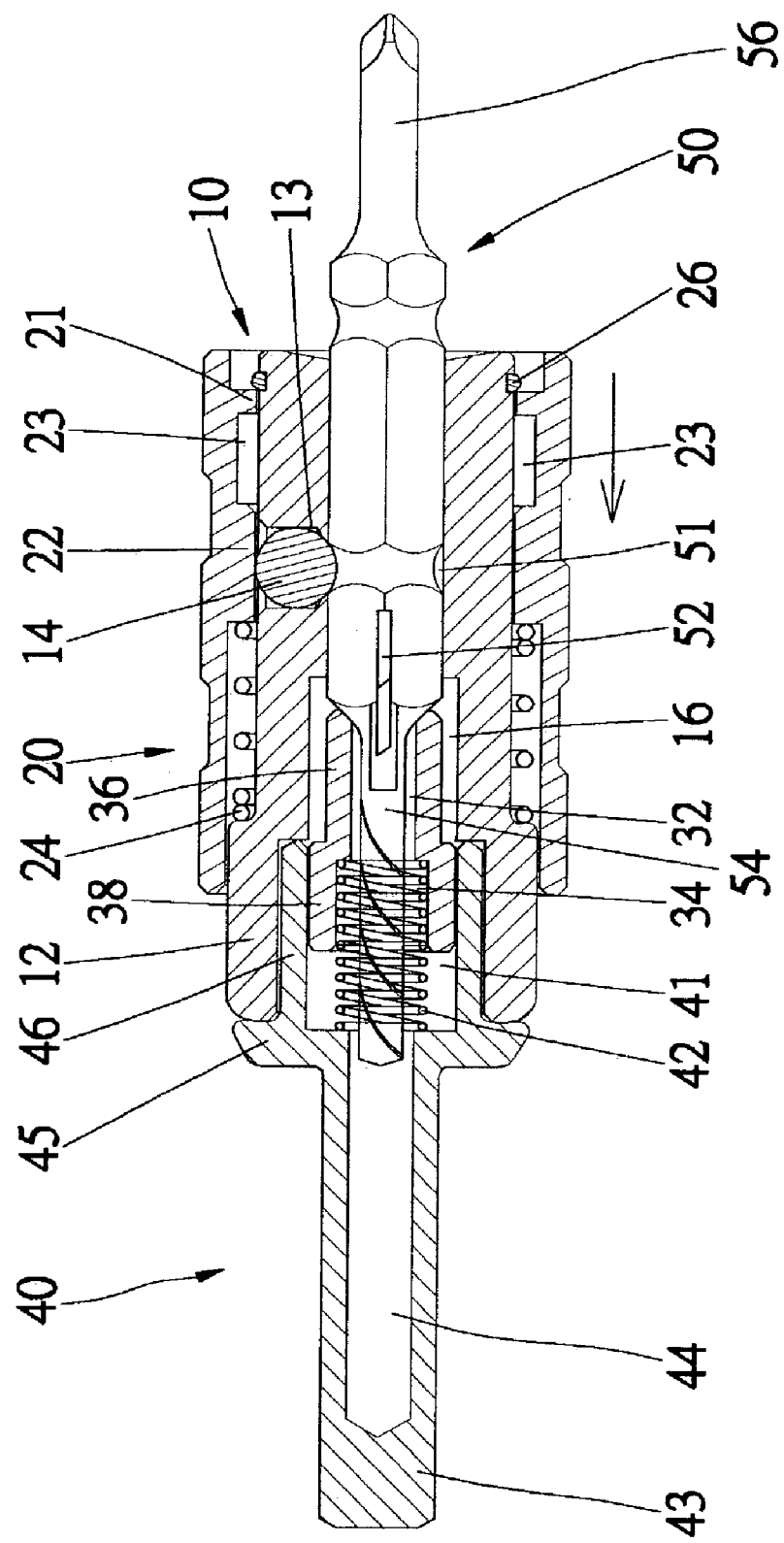
FIG. 8 is similar to FIG. 7 but showing the collar moved relative to the socket.
Figure 9:
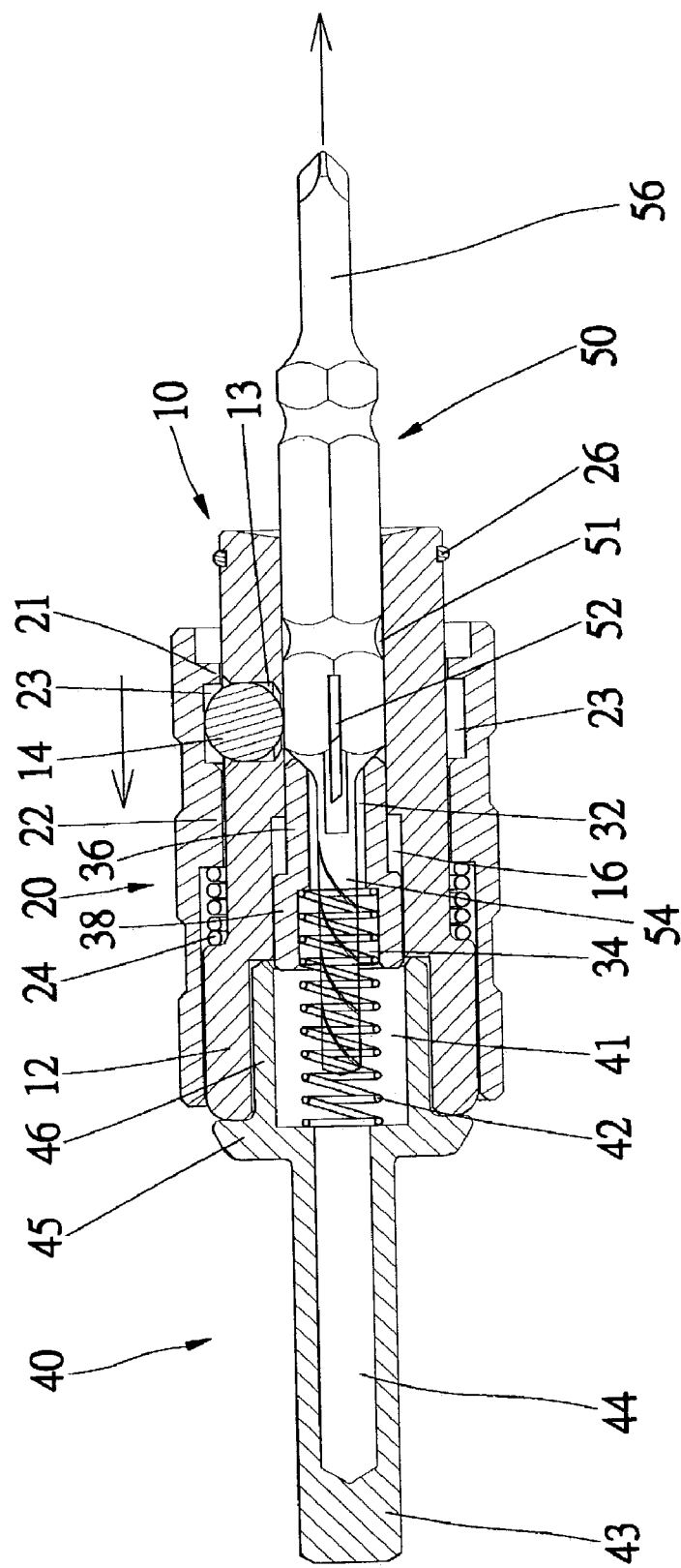
FIG. 9 is similar to FIG. 6 but showing the tool bit ejected from the chuck apparatus.

The user can push, with one hand, the collar 20 in a direction as indicated with an arrow in FIG. 8. In a position as shown in FIG. 9, the ball detent 14 is allowed to enter the first chamber 23 of the collar 20, i.e., allow the ball detent 14 to leave the first chamber 15 of the socket 10 and the annular groove 51 of the tool bit 50. Thus, the tool bit 50 is ejected from the chuck apparatus by means of the pusher 30 biased by means of the spring 42 abutted against the joint 40. Hence, the user does not have to take, with the other hand, the tool bit 50 from the chuck apparatus.

Figure 10:
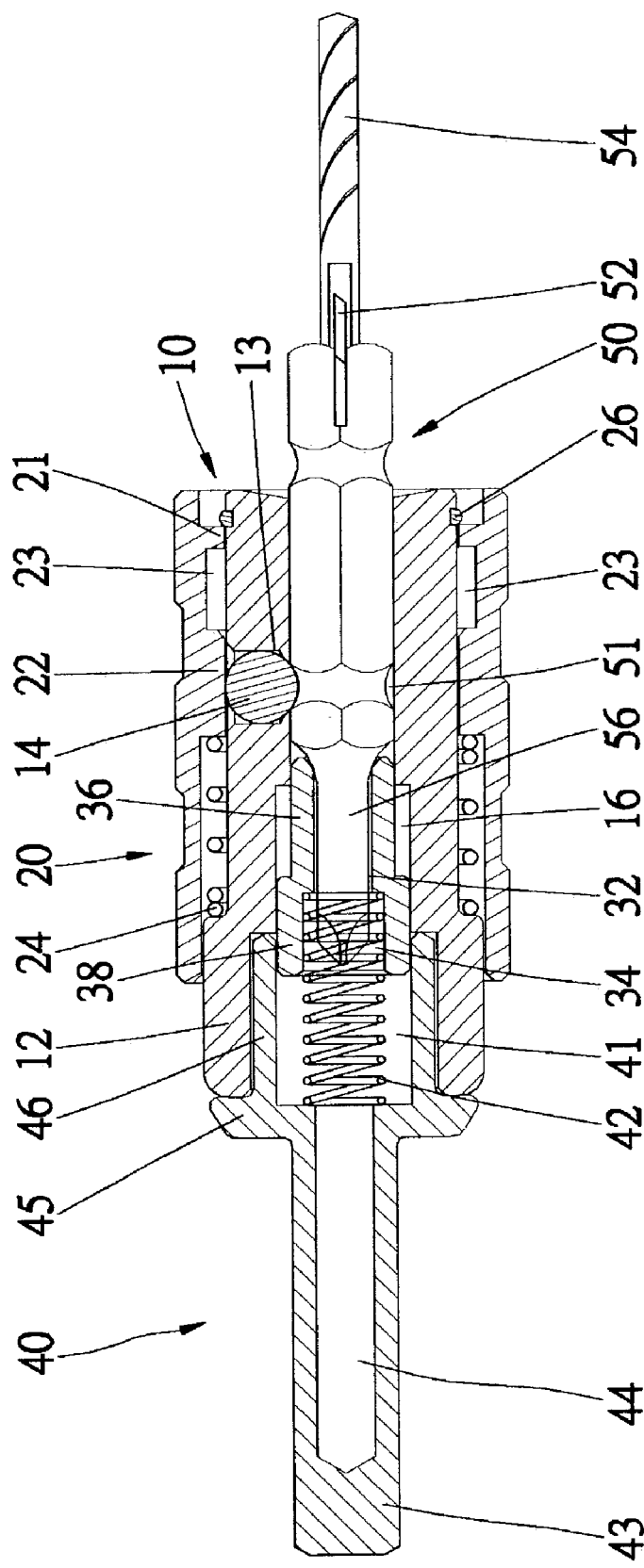
FIG. 10 is similar to FIG. 7 but showing the chuck apparatus locking the tool bit in an opposite direction.
Figure 11:
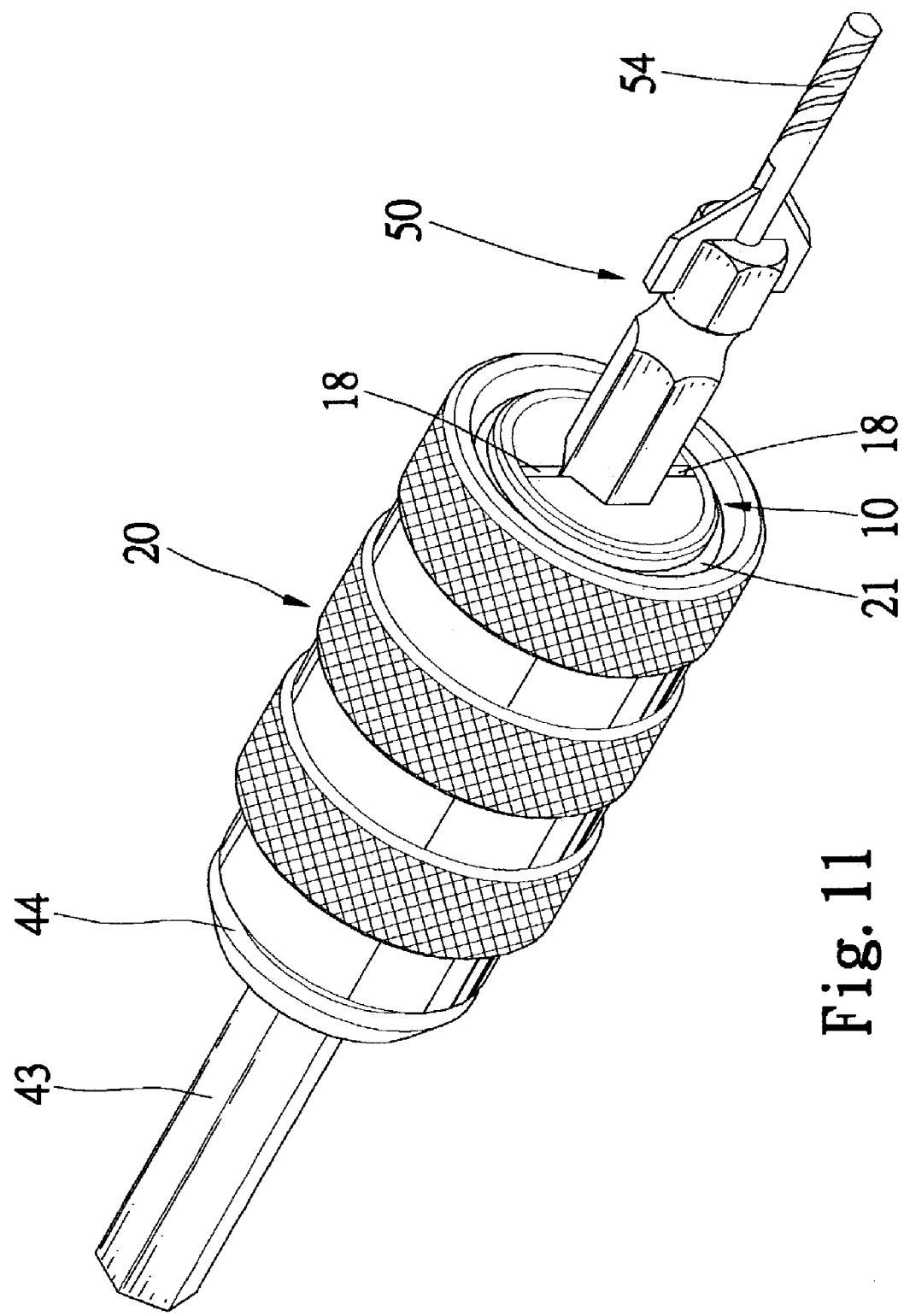
FIG. 11 is a perspective view of the chuck apparatus and the tool bit of FIG. 10.
Figures 12, 13:
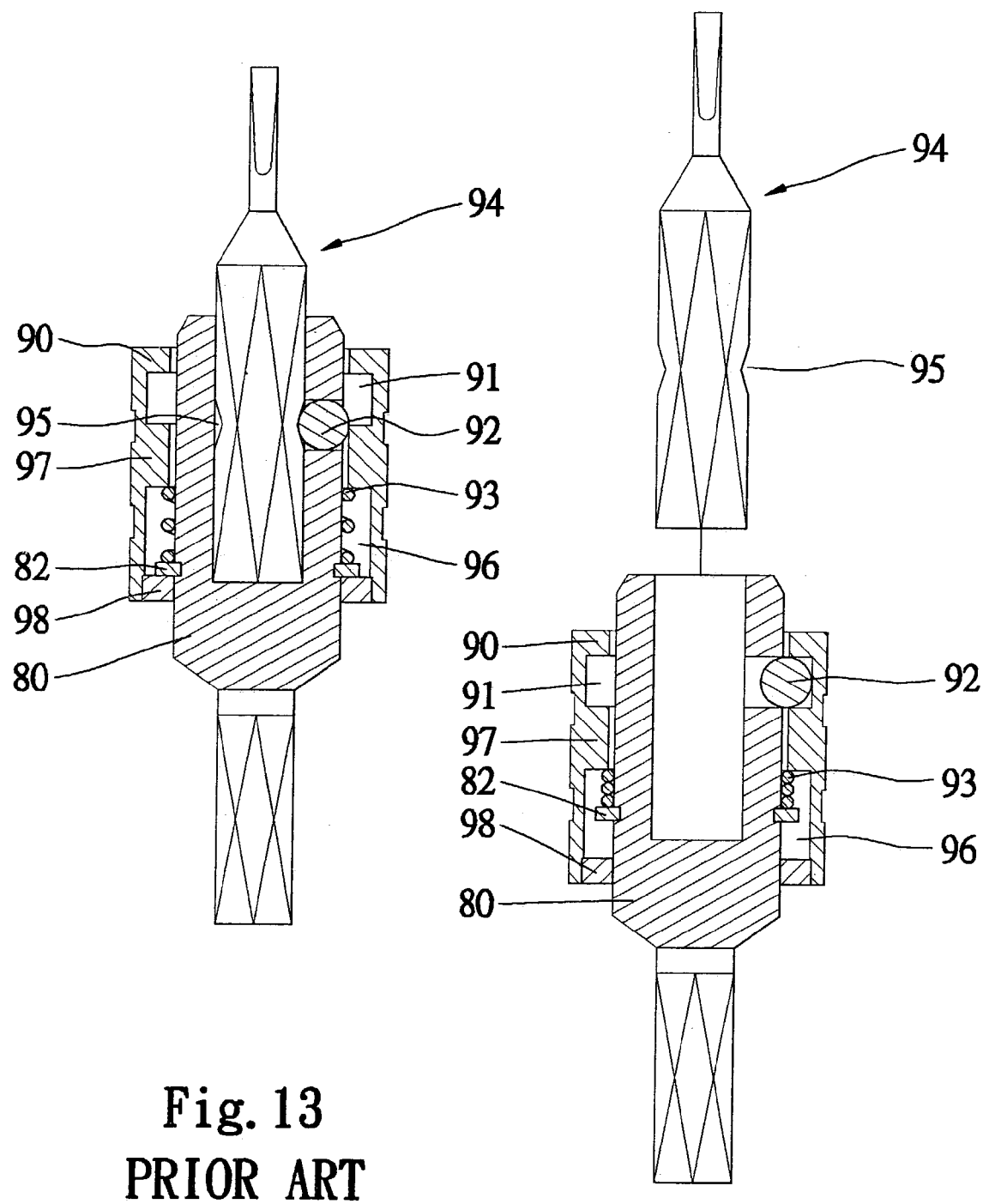
FIG. 12 is a cross-sectional view of a conventional chuck apparatus ready for receiving and releasing a tool bit.
FIG. 13 is similar to FIG. 12 but showing the chuck apparatus locking the tool bit.

Referring to FIGS. 10 and 11, the chuck apparatus locks the tool bit 50 in a direction opposite to that is shown in FIGS. 1~9.

The present invention has been described via detailed illustration of two embodiments. Those skilled in the art can derive many variations from the embodiments without departing from the scope of the present invention. Therefore, the embodiments shall not limit the scope of the present invention defined in the claims.

What is claimed is:

1. A chuck apparatus for holding a conventional tool bit including a drill, two blades, another working head and an annular groove, the chuck apparatus including:
   a socket defining an axial hole, a peripheral hole communicated with the axial hole and two slots for receiving the blades;
   a ball detent put in the peripheral hole for insertion in the annular groove;
   a collar movably mounted on the socket between a locking position for pushing the ball detent into the annular groove and a releasing position for allowing the ball detent to leave the annular groove; and
   a joint including a first section secured to the socket and a second section for connection with a motor.

2. The chuck apparatus according to claim 1 wherein the first section of the joint is fit in the axial hole of the socket.

3. The chuck apparatus according to claim 1 including:
   a pusher put movably in the axial hole of the socket for pushing the tool bit, the pusher defining an axial hole for receiving a portion of the tool bit and two slots for receiving the blades; and
   a spring put between the pusher and the joint.

4. The chuck apparatus according to claim 3 wherein the axial hole of the pusher includes a first chamber and an enlarged second chamber, thus forming an annular shoulder between the first and second chambers, and an end of the spring is inserted in the second chamber of the pusher and abutted against the annular shoulder of the pusher.

5. The chuck apparatus according to claim 3 wherein the first section of the insert defines a chamber for receiving a portion of the spring.

* * * * *